United States Patent
Yang et al.

(10) Patent No.: US 12,194,888 B2
(45) Date of Patent: Jan. 14, 2025

(54) ENERGY CONTROL METHOD FOR HYBRID BUS USING HYDROGEN FUEL CELL AND POWER BATTERY

(71) Applicant: HIGER BUS COMPANY LIMITED, Suzhou (CN)

(72) Inventors: Kun Yang, Suzhou (CN); Bin Xu, Suzhou (CN); Debao Dong, Suzhou (CN); Haimei Fan, Suzhou (CN); Jinfeng Xiong, Suzhou (CN); Chun Li, Suzhou (CN)

(73) Assignee: HIGER BUS COMPANY LIMITED, Suzhou (CN)

( * ) Notice: Subject to any disclaimer, the term of this patent is extended or adjusted under 35 U.S.C. 154(b) by 530 days.

(21) Appl. No.: 17/622,342

(22) PCT Filed: Oct. 13, 2020

(86) PCT No.: PCT/CN2020/120518
§ 371 (c)(1),
(2) Date: Dec. 23, 2021

(87) PCT Pub. No.: WO2021/120798
PCT Pub. Date: Jun. 24, 2021

(65) Prior Publication Data
US 2022/0250509 A1    Aug. 11, 2022

(30) Foreign Application Priority Data

Dec. 16, 2019    (CN) .......................... 201911292777.9

(51) Int. Cl.
*B60L 58/30*    (2019.01)
*B60L 50/75*    (2019.01)
(Continued)

(52) U.S. Cl.
CPC .............. *B60L 58/30* (2019.02); *B60L 50/75* (2019.02); *B60L 58/13* (2019.02); *B60L 58/16* (2019.02);
(Continued)

(58) Field of Classification Search
CPC .......... B60L 58/30; B60L 58/16; B60L 58/13; B60L 50/75; B60L 2260/52; B60L 2260/54
(Continued)

(56) References Cited

U.S. PATENT DOCUMENTS

2011/0273131 A1*  11/2011  Yoon .................... H01M 10/46
                                                                      320/101

FOREIGN PATENT DOCUMENTS

| CN | 107901776 A | 4/2018 |
| CN | 109795374 A | 5/2019 |

(Continued)

*Primary Examiner* — Nathaniel R Pelton
(74) *Attorney, Agent, or Firm* — SZDC Law PC

(57) ABSTRACT

An energy control method for a hybrid bus using a hydrogen fuel cell and a power battery are disclosed. The method includes the following steps: collecting motor power data; selecting an SOC value from a certain range around an average motor power value, and performing interpolation assignment on a pile power range; adding vehicle parking determination; locking a pile variable-load frequency standard, and assessing whether requirements are satisfied; determining SOH state of the battery; and adding an operation of forced pile startup during low SOC. Based on a pile system control unit, BMS and a vehicle control unit (VCU) system, the present invention can designate and optimize an energy control strategy by means of real-time data, and determine the power state of the vehicle through VCU, and (Continued)

add an operation of low-power power supply by the pile during parking and an operation of forced pile startup during low SOC.

7 Claims, 4 Drawing Sheets

(51) Int. Cl.
*B60L 58/13* (2019.01)
*B60L 58/16* (2019.01)

(52) U.S. Cl.
CPC ....... *B60L 2260/52* (2013.01); *B60L 2260/54* (2013.01)

(58) Field of Classification Search
USPC ........................................................ 320/104
See application file for complete search history.

(56) References Cited

FOREIGN PATENT DOCUMENTS

| | | |
|---|---|---|
| CN | 110271454 A | 9/2019 |
| CN | 110549914 A | 12/2019 |
| CN | 111055728 A | 4/2020 |
| IN | 110015211 A | 7/2019 |
| JP | 2014056771 A | 3/2014 |

* cited by examiner

ENERGY CONTROL METHOD FOR HYBRID BUS USING HYDROGEN FUEL CELL AND POWER BATTERY

This application is the National Stage Application of PCT/CN2020/120518, filed on Oct. 13, 2020, which claims priority to Chinese Patent Application No. 201911292777.9, filed on Dec. 16, 2019, which is incorporated by reference for all purposes as if fully set forth herein.

FIELD OF THE INVENTION

The present invention relates to the field of new energy buses, in particular to an energy control method for a hybrid bus using a hydrogen fuel cell and a power battery.

BACKGROUND OF THE INVENTION

A hydrogen fuel cell is a device that uses hydrogen and oxygen/air as reaction gases, and uses catalyzed chemical reactions to reduce the energy barrier of the oxygen reduction reaction to generate electrons, thereby generating an electric current to provide electrical energy for the load. Making use of the Carnot thermal cycle, this device has a very high thermoelectric conversion efficiency, and only produces water with zero pollution to the environment, absolutely environment-friendly. It has been widely used in portable power supplies, fixed power supplies/stations, road transportation, shipping and military fields. However, the electrochemical reaction of the fuel cell has a time window, that is, the power response thereof takes time, so the fuel cell needs to cooperate with other types of energy storage mechanisms to complete the stable output and supply of energy. It is common that the hydrogen fuel cell cooperates with a power battery to balance the load demand and reduce the peak and valley of the pile power.

The patent No. CN 110329109A discloses a control method of an energy management system of a hydrogen-fuel-battery vehicle. The system comprises a fuel cell, a start motor, a drive motor, a vacuum flywheel energy storage device, VCU, FCU, first and second MEUs and BMS. FCU uses the collected information of SOC, vehicle speed, an accelerator pedal, and a brake pedal to determine the vehicle state and energy management state through VCU, thereby triggering the corresponding energy control strategy.

The patent No. CN 110040038A discloses an energy management control method for a hydrogen-electric hybrid fuel cell bus. The required power of the drive motor of the vehicle is calculated based on the collected data, and the optimal target power output is provided on the premise of guaranteeing SOC according to the calculation results and the collected SOC signals, etc., so as to lock the energy control strategy. SOC of the power battery is ensured to be within the equilibrium range. On the basis of satisfying the power performance requirements of the vehicle, the service life of the fuel cell is prolonged.

In the prior art, both power batteries and fuel batteries have a working range of high efficiency and long service life from the perspective of efficiency and service life. Therefore, how to control the energy output is one of the keys to improve the energy supply efficiency and prolong the service life.

CONTENTS OF THE INVENTION

The present invention has the following object: The present invention provides an energy control method for a hybrid bus using a hydrogen fuel cell and a power battery, so as to lock the first energy control strategy on the premise of guaranteeing the energy margin of SOC based on the power output data of the drive motor of the vehicle; the present invention adjusts the strategy in combination with the variable-load frequency data of the pile based on the actual implementation situation; vehicle parking determination is added to reduce the impact of switching on and off of the fuel cell system on the pile system; moreover, the present invention ensures the pile to run at an acceptable low power, maintains the stability of SOC of the power battery, and prolongs the service life of the battery.

The present invention adopts the following technical solution:

An energy control method for a hybrid bus using a hydrogen fuel cell and a power battery is provided, comprising the following steps:

S1. collecting motor power data;

S2. selecting an SOC value from a certain range around an average motor power value, and performing interpolation assignment on a pile power range;

S3. adding vehicle parking determination;

S4. locking a pile variable-load frequency standard, and assessing whether requirements are satisfied;

S5. determining SOH state of the battery; and

S6. adding an operation of forced pile startup during low SOC.

Specifically, step S1 comprises for the target vehicle, pure electric mode operation is carried out under specific working conditions to collect data information of motor current, motor voltage, motor output power, auxiliary system power, battery current, battery voltage, battery output power, and SOC of the battery, and then calculating an average motor power required by the vehicle in the driving state;

in step S2, the principle of "performing interpolation assignment on a pile power range" is as follows: (1) a target power of a pile system is equal to the average motor power; (2) the maximum power of the pile system is the maximum output power $P_{max}$ of the pile; (3) the minimum power of the pile system is the allowable minimum power $P_{min}$ of the pile system; and (4) equivalent interpolation is performed on the pile power in an SOC range of 5% to 20%, i.e. $(P_{max}-P_{min})/n$, n=5–20;

in step S3, a comparison is made between the motor power $P_{motor1}$ for parking before 10 min and the motor power $P_{motor2}$ for parking after 10 min: if $P_{motor2}=P_{motor1}=0$, a vehicle control unit (VCU) makes a target power $P_{min}$ inputted to a fuel cell system control unit (FCU); and the motor power begins to be determined at the same time: if $P_{motor}\geq 0$, table lookup is performed for power, and the target power is locked by locking the SOC value of the battery and outputted to fuel cell system control unit FCU;

in step S4, a variable-load frequency f satisfying service life requirements of the pile is locked according to fuel cell polarization and an LSV curve, an energy control strategy of a real vehicle is locked according to step S2 for a working condition test or simulation analysis, and the pile variable-load frequency is assessed according to the requirements and adjusted;

in step S5, after step S4 is completed and the strategy satisfies the requirements, SOC state of the battery, including an SOC floating range and power throughput, and the SOH state of the battery are assessed: if the SOC floating range exceeds a healthy range, a corresponding interpolation target power shall be adjusted up or down appropriately; and in step S6, during operation of a dual-battery system, BMS tracks changes in SOC of the battery; when SOC is lower than a certain value S0, a hybrid-start button state is ignored, and the pile is forced to start according to a specified target power to complete battery charging and ensure SOH of the battery.

The advantages of the present invention over the prior art are as follows:

Based on the pile system control unit, BMS and the vehicle control unit system, the present invention can designate and optimize an energy control strategy by means of real-time data. In addition, the present invention determines the power state of the vehicle through VCU, and adds an operation of low-power power supply by the pile during parking and an operation of forced pile startup during low SOC, further guaranteeing the healthy working state of the pile and battery. The power output of the pile will thus be as low as possible on the basis of satisfying the power requirements of the vehicle as far as possible, so as to guarantee the service life of the pile and reduce the hydrogen consumption. Besides, the battery is also enabled to work in an interval of higher and stable SOC to prolong the service life of the battery.

BRIEF DESCRIPTION OF THE DRAWINGS

The present invention will be further described below with reference to drawings and examples.

DETAILED DESCRIPTION OF THE EMBODIMENTS

Figure 1:
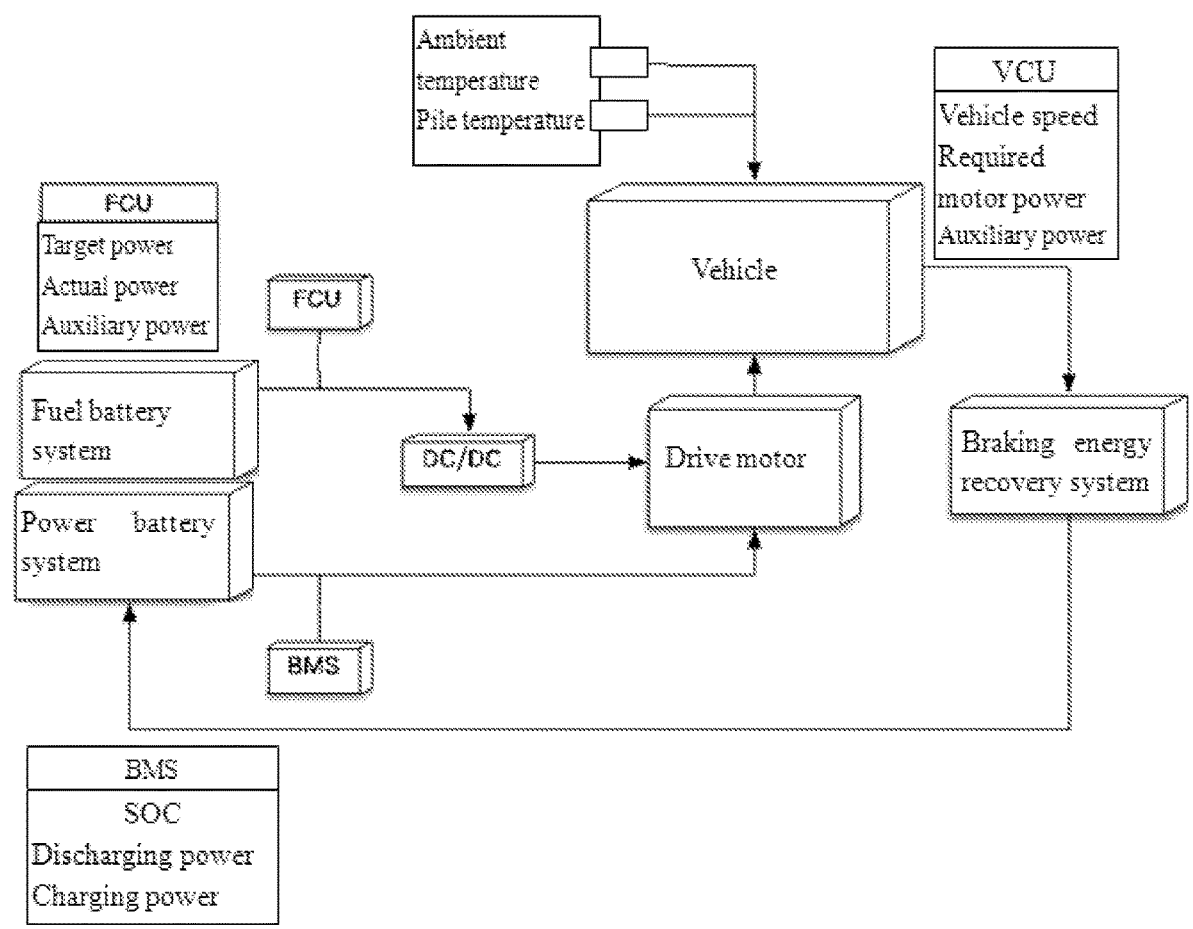
FIG. 1 is a structural schematic diagram of a hybrid power system of a hydrogen fuel cell and a power battery.

A hybrid power system of a hydrogen fuel cell and a power battery as shown in FIG. 1 involves vehicle control unit, fuel cell system control unit, BMS, etc., The vehicle control unit mainly performs relevant data statistics on the motor operation and power output, including voltage, current, output power, etc.; it monitors the relevant operation state and performs calculation, including the calculation of motor operation state and motor output power; it performs the table lookup according to the preset rules to lock the target pile power, and makes instructions inputted to FCU and BMS to control the energy state of the vehicle.

The fuel cell system control unit mainly accepts instructions sent by the vehicle control unit, and converts the target power into an actual power by adjusting the back pressure of hydrogen and air, and the temperature of the pile, etc. before outputting the actual power.

BMS mainly performs data statistics on battery operation, voltage, current, and power output, and executes the target power instruction of the vehicle control unit to complete the output; besides, it sends a warning message for the state not conducive to SOH of the battery to the vehicle control unit, which makes relevant determinations before controlling the vehicle energy.

Figure 2:
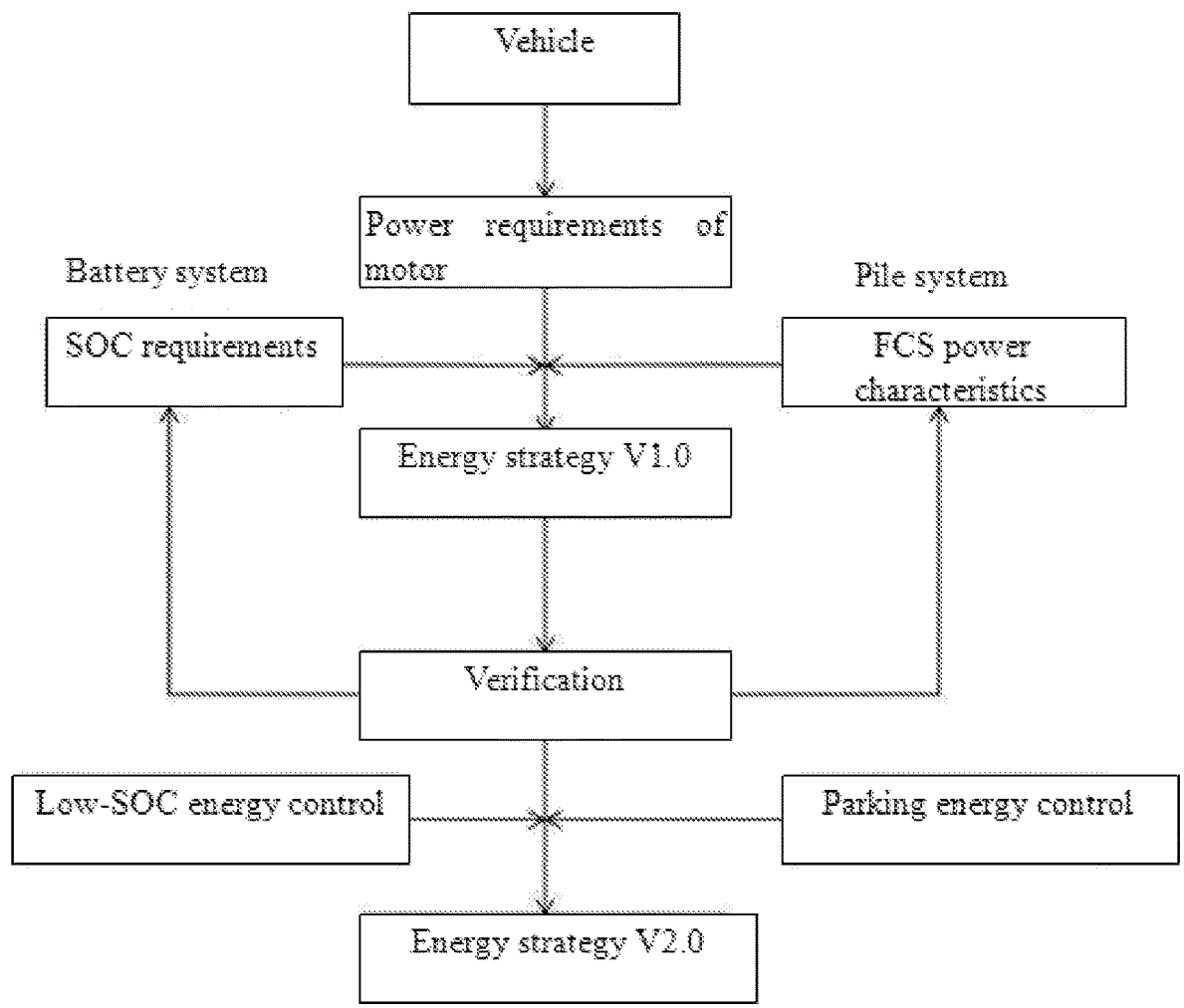
FIG. 2 is a flowchart of the energy control method for a hybrid bus using a hydrogen fuel cell and a power battery of the present invention.
Figure 3:
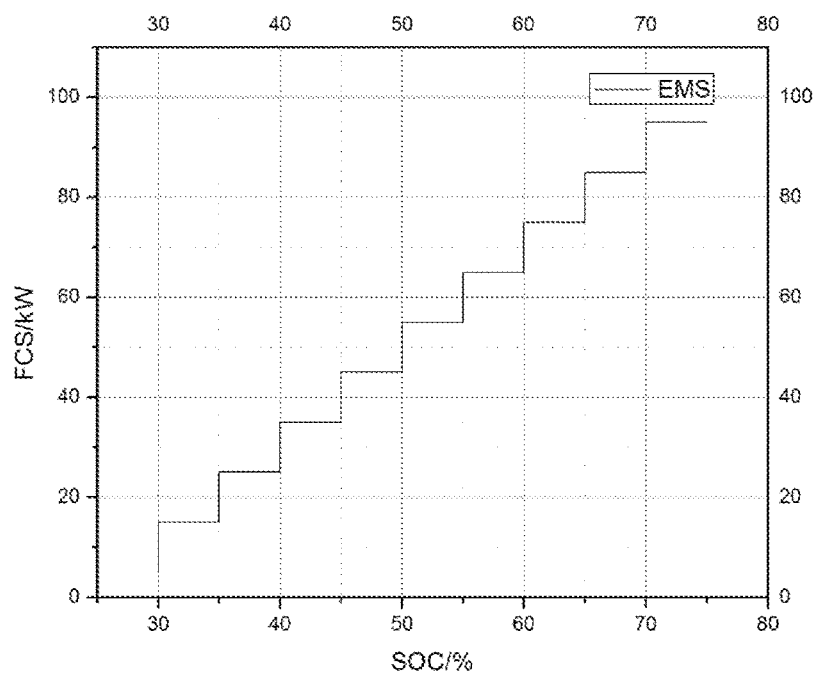
FIG. 3 is a graph of the energy control strategy.
Figure 4:
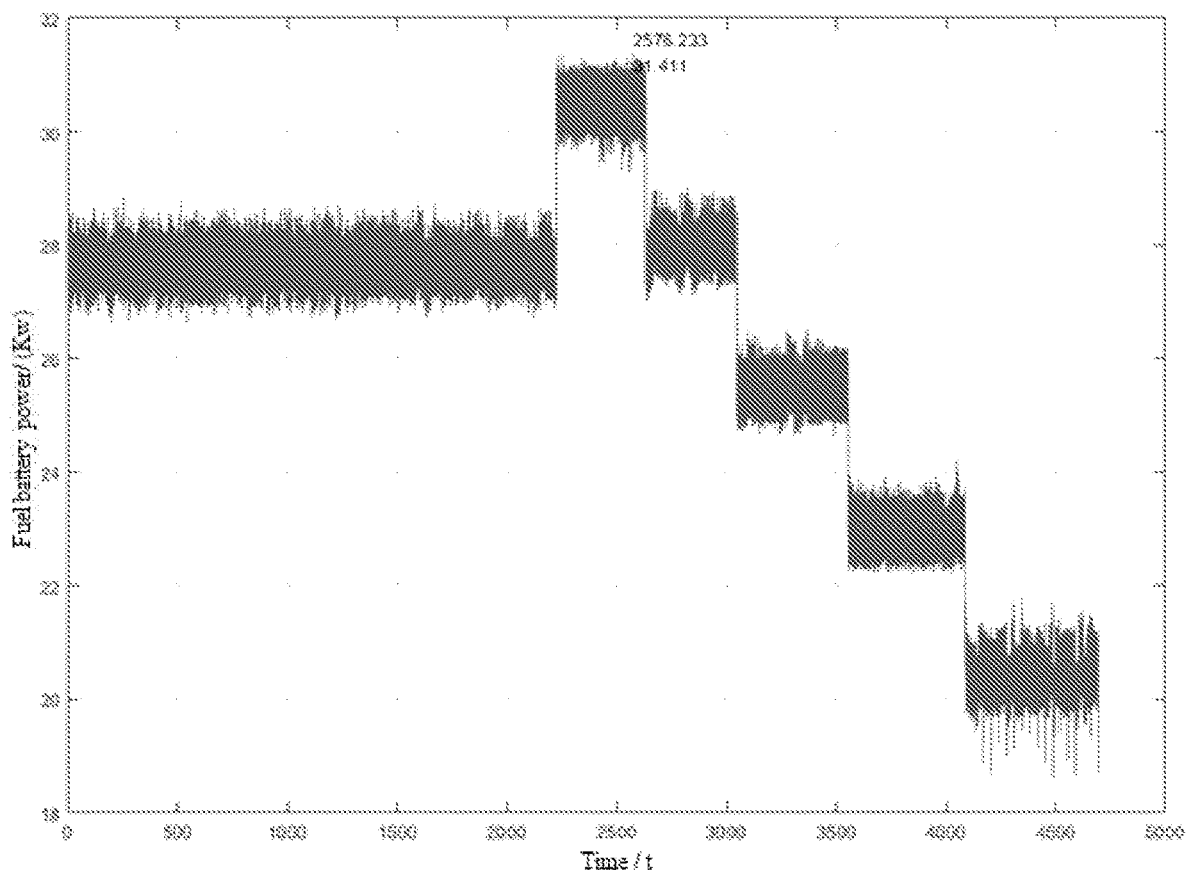
FIG. 4 is a graph of the power variable-load of the pile system.
Figure 5:
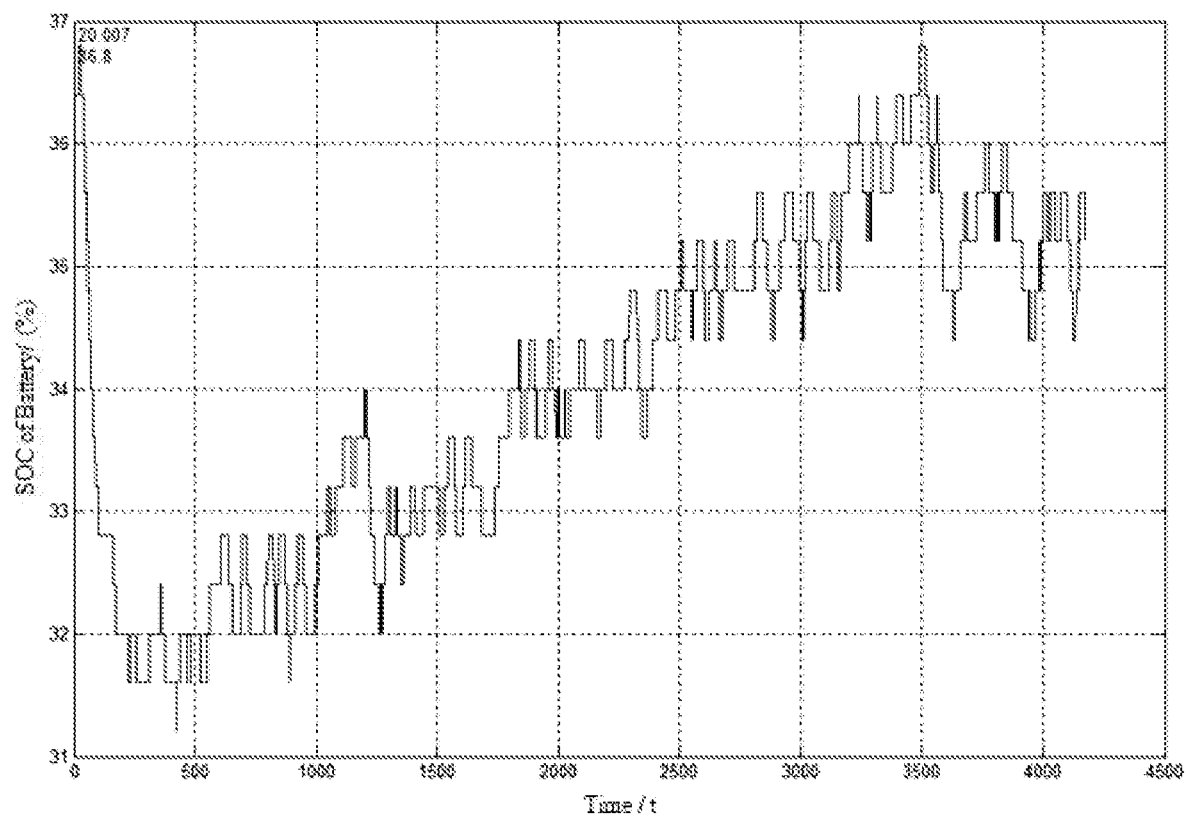
FIG. 5 is a graph showing the change in SOC of the battery of the pile system.

As shown in FIG. 2, the energy control method for a hybrid bus using a hydrogen fuel cell and a power battery in this example comprises the following steps:

step S1: For the target vehicle, pure electric mode operation is carried out under specific working conditions to collect data information of motor current, motor voltage, motor output power, auxiliary system power, battery current, battery voltage, battery output power, and SOC of the battery, etc., and then calculating the average motor power required by the vehicle in the driving state that is 25 kW;

step S2: locking the minimum power, rated power and maximum power of the pile system, such as the minimum power of 5 kW, the rated power of 35 kW, and the maximum power of 95 kW for a certain pile; the "25 kW" obtained in step 1 is used as the stable output power of the fuel cell, and the equivalent interpolation on both sides of the "25 kW" is May 15, 2025-30-45-55-65-75-85-95; the change interval of SOC in SOH of the battery is defined as 30% to 75%, and the change interval of SOC is determined to be 30-35-40-45-50-55-60-65-70-75 according to the number of equivalent interpolation groups of the pile power; the locking energy control strategy after one-to-one correspondence is shown in FIG. 3;

step S3: for parking for more than 10 min, executing the pile power of 5 kW, otherwise executing the control strategy obtained in step S2;

step S4: performing simulation or a real vehicle test according to the strategy obtained in step S2 to obtain the power variable-load and an SOC change curve of the pile system, as shown in FIG. 4, with the pile variable-load requirements greater than or equal to 10 min/time; it can be seen from the variable-load frequency curve that the variable-load frequency satisfies the requirements; if the variable-load frequency does not satisfy the requirements, the target pile power at the SOC point shall be appropriately reduced, and combination can be timely made with adjacent power points; as shown in FIG. 5, SOC requires 30% to 75%; it can be seen from the SOC change curve that SOC satisfies the requirements; if SOC does not satisfy the requirements: (1) the target power in the SOC area is increased in the case of being lower than $S_{min}$; and (2) the target power in the SOC area is decreased in the case of being higher than $S_{max}$; and step S5: determining whether there is a time period when SOC is lower than 30%; if there is such a time period and the pile system is in the shutdown state, VCU needs to issue an instruction to force the startup, and lock through calculation the pile power that enables SOC to quickly return to the healthy range.

In summary, the present invention invents an energy control strategy design method based on a vehicle control system, a fuel-battery-system control system, and a BMS control system. This method can be used to design and formulate the energy control strategy of hybrid buses. While satisfying the power requirements of vehicles, this method can ensure that batteries and fuel batteries work in a healthy and low energy consumption state, thus guaranteeing low energy consumption and long service life of the energy system.

The above examples are only intended to illustrate the technical concept and features of the present invention, and to enable those skilled in the art to understand the present invention and implement it. The scope of protection of the present invention is not limited by the above examples. Any modification made according to the spiritual substance of the main technical solution of the present invention will all fall within the scope of protection of the present invention.

The invention claimed is:

1. An energy control method for a hybrid bus using a hydrogen fuel cell and a power battery, characterized in that: the method comprises the following steps:
   S1. collecting motor power data;
   S2. selecting an SOC value from a range of an average motor power value, and performing an interpolation assignment on a pile power range;
   S3. adding vehicle parking determination;
   S4. locking a pile variable-load frequency standard, and assessing whether requirements are satisfied;
   S5. determining SOH state of the power battery; and
   S6. adding an operation of forced pile startup during low SOC.

2. The energy control method according to claim 1, characterized in that:
   step S1 comprises, for a target vehicle, 100% electric mode operation is carried out to collect data information of motor current, motor voltage, motor output power, auxiliary system power, battery current, battery voltage, battery output power, and SOC of the power battery, and then calculating the average motor power value required by the target vehicle in the driving state.

3. The energy control method according to claim 2, characterized in that:
   in step S2, a principle of "performing the interpolation assignment on the pile power range" is as follows: (1) a target power of a pile system is equal to the average motor power; (2) a maximum power of the pile system is a maximum output power $P_{max}$ of the pile; (3) a minimum power of the pile system is an allowable minimum power $P_{min}$ of the pile system; and (4) equivalent interpolation is performed on the pile power in an SOC range of 5% to 20%, i.e. $(P_{max}-P_{min})/n$, n=5-20.

4. The energy control method according to claim 3, characterized in that:
   in step S3, a comparison is made between a motor power $P_{motor1}$ for parking before 10 min and a motor power $P_{motor2}$ for parking after 10 min: if $P_{motor2}=P_{motor1}=0$, a vehicle control unit (VCU) makes a target power $P_{min}$ inputted to a fuel cell system control unit (FCU); and the motor power begins to be determined at the same time: if $P_{motor} \geq 0$, table lookup is performed for power, and the target power is locked by locking the SOC value of the power battery and outputted to fuel cell system control unit FCU.

5. The energy control method according to claim 4, characterized in that:
   in step S4, a variable-load frequency f satisfying service life requirements of the pile is locked according to fuel cell polarization and a Linear sweep voltammetry (LSV) curve, an energy control strategy of a real vehicle is locked according to step S2 for a working condition test or simulation analysis, and the pile variable-load frequency is assessed according to the requirements and adjusted.

6. The energy control method according to claim 5, characterized in that:
   in step S5, after step S4 is completed and the strategy satisfies the requirements, SOC state of the power battery, including an SOC floating range and power throughput, and the SOH state of the power battery are assessed: if the SOC floating range exceeds a healthy range, a corresponding interpolation target power shall be adjusted up or down appropriately.

7. The energy control method according to claim 6, characterized in that:
   in step S6, during operation of a dual-battery system, BMS tracks changes in SOC of the power battery; when SOC is lower than a certain value S0, a hybrid-start button state is ignored, and the pile is forced to start according to a specified target power to complete battery charging and ensure SOH of the power battery.

* * * * *